United States Patent [19]

Meacham

[11] 3,948,540
[45] Apr. 6, 1976

[54] CONTROLLED FLOW FLUID SUPPLY FOR OCCUPANT RESTRAINT SYSTEMS

[75] Inventor: George B. K. Meacham, Birmingham, Mich.

[73] Assignee: Eaton Corporation, Cleveland, Ohio

[22] Filed: May 15, 1974

[21] Appl. No.: 470,087

Related U.S. Application Data

[63] Continuation of Ser. No. 278,162, Aug. 4, 1972.

[52] U.S. Cl. ............... 280/150 AB; 137/70; 222/5; 141/4
[51] Int. Cl.² .......................................... B60R 21/08
[58] Field of Search .......... 280/150 AB; 137/70, 71, 137/272, 276; 23/281; 141/4; 102/39; 222/3, 5

[56] References Cited
UNITED STATES PATENTS

| | | | |
|---|---|---|---|
| 3,197,234 | 7/1965 | Bertrand | 280/150 AB |
| 3,638,964 | 2/1972 | Chute | 280/150 AB |
| 3,663,036 | 5/1972 | Johnson | 280/150 AB |
| 3,674,059 | 7/1972 | Stephenson | 280/150 AB |
| 3,721,456 | 3/1973 | McDonald | 280/150 AB |
| 3,722,528 | 3/1973 | Fiala | 137/255 |
| 3,767,227 | 10/1973 | Furusho | 280/150 AB |

*Primary Examiner*—M. H. Wood, Jr.
*Assistant Examiner*—John P. Silverstrim
*Attorney, Agent, or Firm*—Teagno & Toddy

[57] ABSTRACT

A fluid supply for an occupant restraint system includes a pair of concentric cylindrical vessels defining inner and outer fluid chambers in fluid communication with each other and with a discharge passage which is normally closed by a shearable member and with expandable confinement. A valve member is slidingly carried within the inner cylinder, exposing one end of the valve member to the inner fluid chamber, and partially defines a control pressure chamber providing metered communication therefrom to the inner fluid chamber. The valve is responsive to the difference in pressure between the control chamber and the inner chamber to move from a position restricting flow from the outer fluid chamber to the inner to a position allowing relatively free flow.

A shearing member is also provided for opening the discharge passage in response to the occurrence of a collision.

26 Claims, 9 Drawing Figures

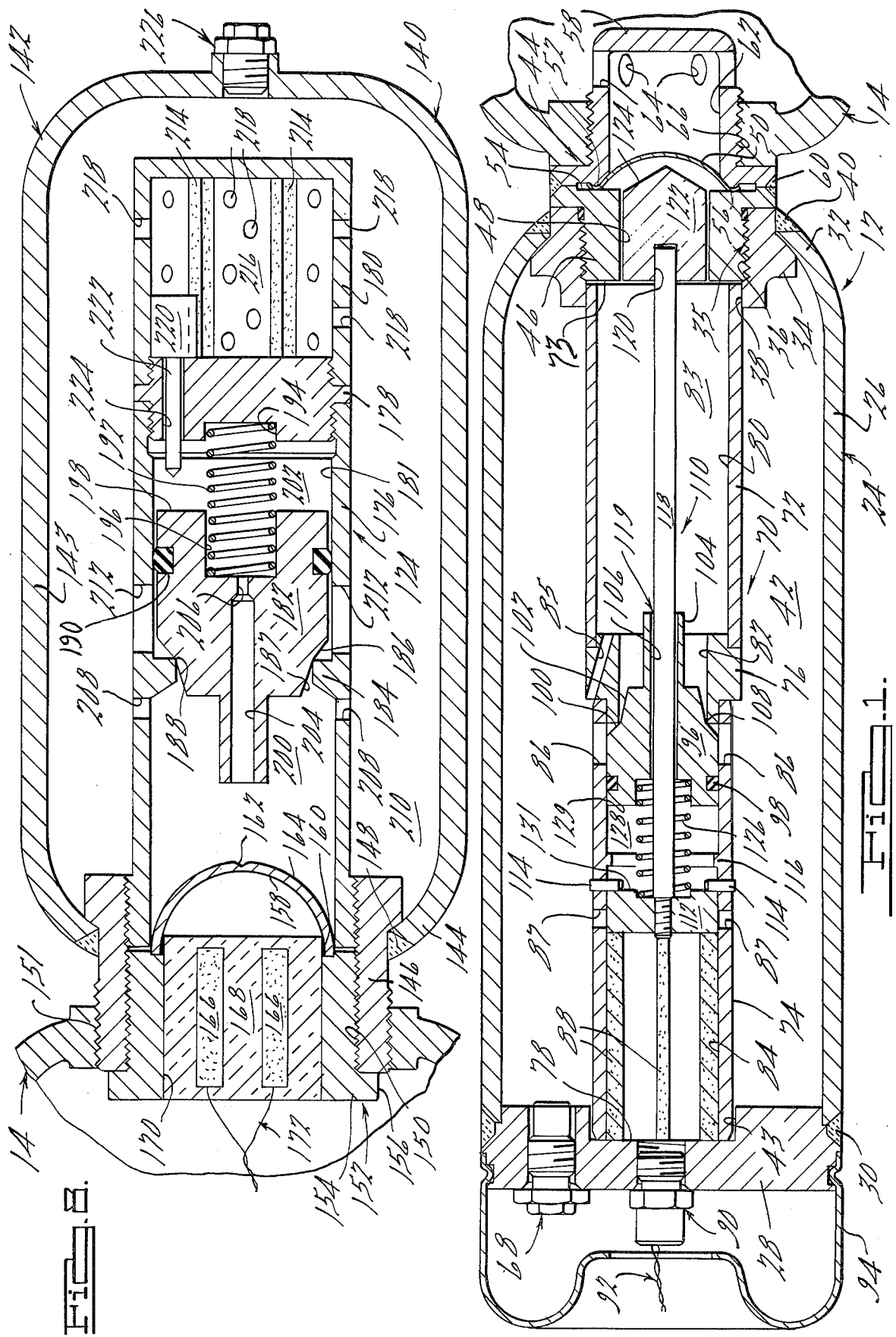

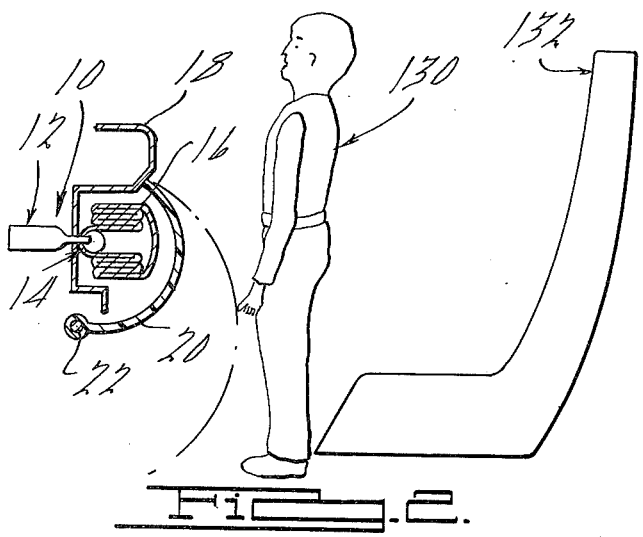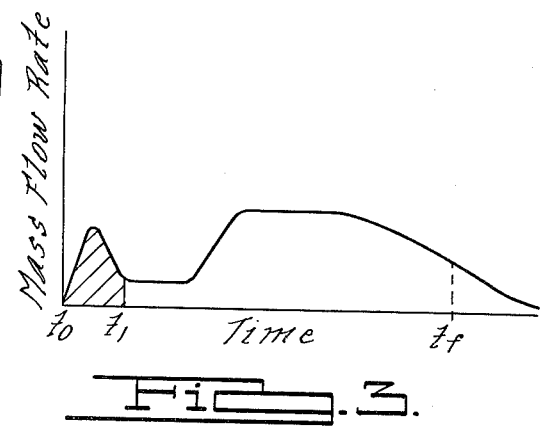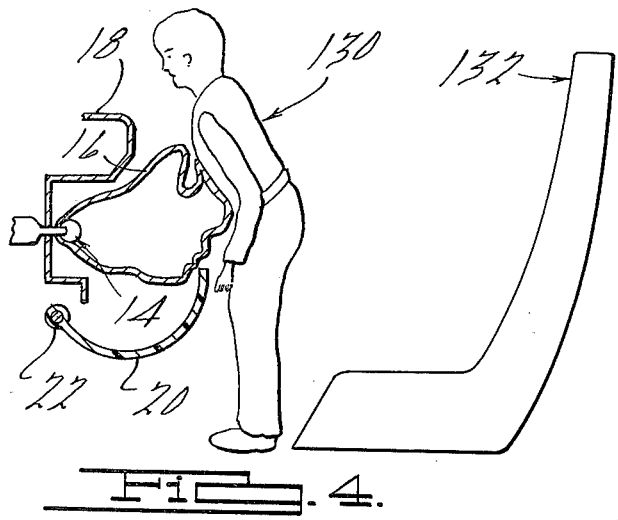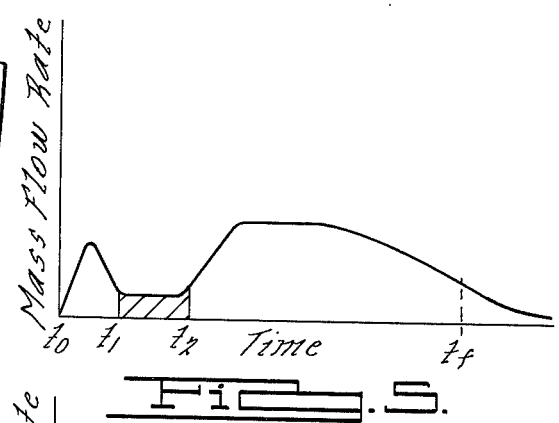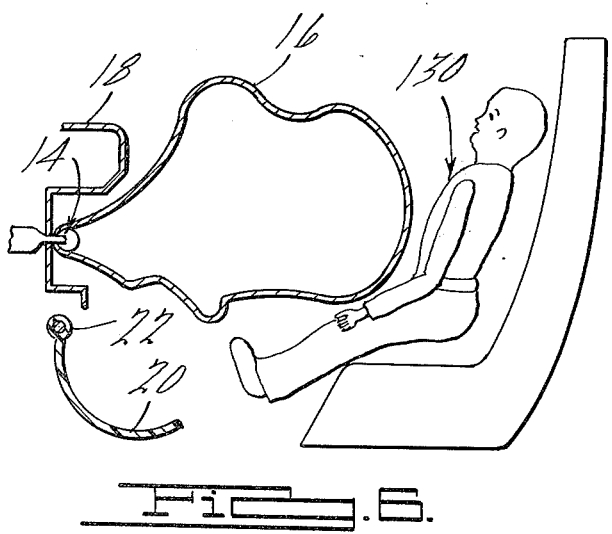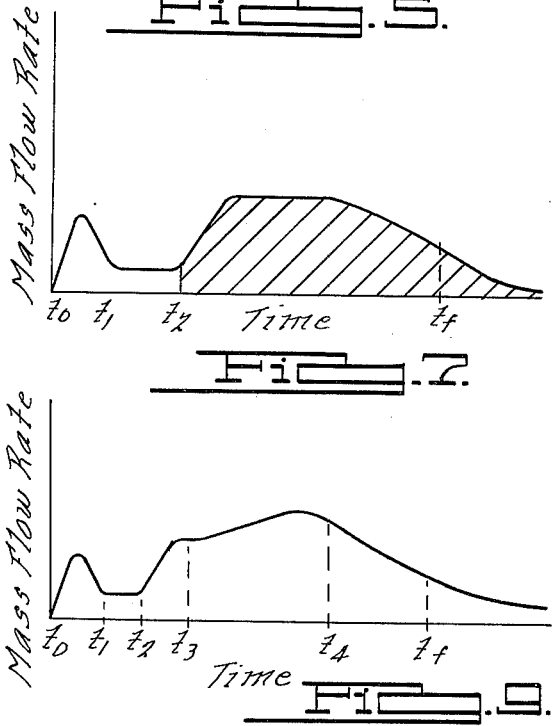

CONTROLLED FLOW FLUID SUPPLY FOR OCCUPANT RESTRAINT SYSTEMS

This is a continuation of application Ser. No. 278,162, filed Aug. 4, 1972.

BACKGROUND OF THE INVENTION

1. Field of the Invention

The present invention relates generally to a fluid supply for an occupant restraint system of the type having an expandable confinement which is expanded by the fluid supply to restrain movement of an occupant of a vehicle during a collision.

2. Description of the Prior Art

The expandable confinement has a collapsed inoperative condition for storage in a steering wheel, dashboard, or other location within a vehicle forward of a normal occupant position. Upon the occurrence of a collision of the vehicle, expansion of the confinement is generally effected by a fluid supply in the form of a pressure vessel defining a single chamber which contains stored pressurized gas. The stored gas is released from the chamber by rupturing a portion of the pressure vessel which communicates with a gas directing means, such as a diffuser, communicating with the interior of the confinement.

With such an occupant restraint system, the complete expansion of the confinement must occur within an extremely short period of time, e.g., less than one hundred milliseconds, after the initial impact in order to effectively restrain the occupant. The portion that is ruptured in the single chamber fluid supply is fixed in size and configuration. In order to complete expansion of the confinement within the desired time period, the ruptured portion is of a size which results in the mass flow rate of gas from the chamber reaching a maximum value almost immediately after the rupturing occurs. After reaching the maximum value, the mass flow rate of gas gradually decreases during the continued expansion of the confinement. Although such a fluid supply performs satisfactorily in most instances, it would be desirable to be able to control the mass flow rate of gas from the fluid supply from the time gas begins to enter the confinement until the time the confinement is fully expanded.

SUMMARY OF THE INVENTION

According to one feature of the invention, the fluid supply for the occupant restraint system includes a first pressure chamber filled with pressurized gas, and a valve between the first chamber and the confinement operative upon the occurrence of a collision condition to supply gas to the confinement from the first chamber in a controlled manner which is governed in part by the pressure of gas in a second chamber which is vented upon the occurrence of the collision condition.

According to yet another feature of the invention, the fluid supply includes a third chamber filled with pressurized gas and gas generating means are operative to generate a gas upon the occurrence of a collision condition to augment the quantity of pressurized gas in the fluid supply and to cause the rupturing of a portion of the third chamber to provide communication with the confinement.

According to still another feature of the invention, the valve is operative to move from a closed position, in which it effectively blocks communication between the first pressure chamber and the confinement to an open position in which the first pressure chamber communicates with the confinement and gas generating means are provided in the fluid supply to generate a gas in response to the valve moving to the open position.

According to a further feature of the invention, the first chamber is in communications with the third chamber through a passage which provides a flow of gas from the first chamber to the third chamber; the flow of gas through this passage is much less than the flow of gas from the third chamber into the confinement and is used to ensure the continual expansion of the confinement during actuation of the fluid supply.

According to another feature of the invention, the valve has a first end with a first surface communicating with the gas in the third chamber and a second surface communicating with the gas in the first chamber, and a second end opposite the first end with a surface communicating with the gas in the second chamber, whereby the pressure of the gas in the respective chambers acts on the valve to move the valve from the closed to the open position.

BRIEF DESCRIPTION OF THE DRAWINGS

The above features as well as others will become apparent from the preferred embodiments of the invention which are illustrated in the accompanied drawings wherein:

FIG. 1 is a sectional view of a fluid supply for an occupant restraint system;

FIGS. 2, 4 and 6 are schematic views illustrating the position of a standing child in a vehicle and the condition of the confinement in the vehicle at various times during a collision;

FIGS. 3, 5, 7 and 9 are graphs of the relationship of mass flow rate of gas plotted against time for fluid supplies according to the invention;

FIG. 8 is a sectional view of another fluid supply according to the invention.

DESCRIPTION OF THE PREFERRED EMBODIMENTS

Environment of the Embodiments

An occupant restraint system 10 is illustrated in FIG. 2 comprising a fluid supply 12 communicating with fluid directing means, in the form of a diffuser 14 of a known design. Diffuser 14 is in communication with an expandable confinement 16 of a known design. System 10 is located within a dashboard 18 of a motor vehicle and is enclosed by a door 20 operative to pivot about point 22 during expansion of confinement 16 as illustrated in FIGS. 4 and 6.

Construction of the FIG. 1 Embodiment

Fluid supply 12 includes a pressure vessel 24 having a cylindrical open-ended shell 26. An end plate 28 is welded at 30 to enclose one end of shell 26. The other end of shell 26 has a reduced open end portion 32. An annular ring 34, having a central bore 35 including an internally threaded portion 36 and a smooth centrally located bore portion 38, is welded at 40 to reduced portion 32 of shell 26 and extends within an annular pressure chamber 42 defined on its outer periphery by pressure vessel 24. A centrally located cup-shaped bore 43 in end plate 28 is concentric with bore 38 on ring 34.

A rupturable seal assembly 44 is used to close bore 35 of ring 34. Assembly 44 includes an annular collar 46 in threaded engagement with threaded portion 36. Collar 46 defines an outlet passage 48 communicating with the interior of vessel 24. A shear disk 50, in the form of a segment of a hollow sphere, seals outlet passage 48 at one end. An upturned annular lip 52 on shear disk 50 is clamped between an annular outer portion 54 of collar 46 and a conforming portion 56 of a cup-shaped end cap 58.

End cap 58 is welded at 60 to collar 46 and defines an internal passage 62 and a plurality of circumferentially spaced radial exit ports 64. Ports 64 eliminate any propulsive effect that may exist from fluid escaping from fluid supply 12. Threads 66 on the outer portion of end cap 58 engage mating threads on diffuser 14 to connect fluid supply 12 to the diffuser.

A fill valve 68, of a known design, is positioned in end plate 28 and is used for the introduction of fluid into chamber 42. In a typical assembly, the fluid is nitrogen at a pressure of from 2000 to 3000 psi.

A tubular assembly 70 is positioned centrally within vessel 24. Assembly 70 includes first and second axially aligned tubular members 72 and 74 located on opposite sides of an annular center section 76. One end of each tubular member is in engagement with a seat defined on the respective end of center section 76. The other end of tubular member 72 seats within smooth bore portion 38 in abutting engagement with surface 73 of collar 46 and the other end of tubular member 74 seats within bore 43 in abutting engagement with surface 78 of end plate 28 to rigidly secure the assembly within pressure vessel 12. The external cylindrical surfaces of tubular members 72 and 74 and center section 76 together define the inner periphery of annular pressure chamber 42. Cylindrical passages 80, 82 and 84 are axially aligned and are respectively defined by the internal cylindrical surfaces of tubular member 72, center section 76 and tubular member 74. Passages 80, 82 and 84 are further axially aligned with outlet passage 48. Passage 80 partially defines a chamber 83 which communicates with outlet passage 48. A biased passage 85 in center section 76 communicates with chambers 42 and 83.

A plurality of circumferentially spaced radial passages 86 are located at one end of second tubular member 74 adjacent center section 76 and communicate with passage 84 and chamber 42. Another plurality of circumferentially spaced radial ports 87 are located in tubular member 74 and communicate with passage 84 and chamber 42.

Housed within one end of passage 84 of tubular member 74 adjacent bore 43 are a plurality of axially extending strips of gas producing material 88, such as Amoco JT 1/20 produced by Amoco Chemical Company. A centrally located igniter 90, of a known design, is positioned centrally in end plate 28 and projects into passage 84. Electrical leads 92 are connected to igniter 90 and to a collision detecting sensor of a known design (not illustrated). A spring biased end cap 94 is connected to end plate 28 and encloses igniter 90 and fill plug 68.

A cylindrically shaped control valve 96 is in sliding engagement with passage 84 adjacent center section 76. An annular "0" ring 98 located within a circumferential groove encircles valve 96 and contacts tubular member 74 to form a sliding seal therebetween. The end of valve 96 facing passage 80 includes a first surface 100, in the shape of the periphery of a frustum that is at an angle of, for example, 45° with the axis of tubular member 74, and a second surface 102, in the shape of the periphery of a frustum that is at an angle of, for example, 11° with the axis of tubular member 74. The top of the frustum forming surface 100 contacts the base of the frustum forming surface 102. A reduced nose portion 104 of valve 96 projects into passage 80. A passage 106 is centrally located within valve 96 and communicates with passages 80 and 84. Surface 100 contacts an annular relatively sharp corner 108 of center section 76 to form a seal therebetween when valve 96 is located in a position to seal passage 84 and ports 86 from passage 80.

A spear thrower assembly 110 includes a cylindrical plunger 112 in sliding engagement with a portion of passage 84. One end of plunger 112 contacts gas producing strips 88 and the other end contacts shear pins 114 secured to tubular member 74. Pins 114 and strips 88 retain plunger 112 in a fixed position prior to actuation of fluid supply 12. In the absence of pins 114, plunger 112 is free to move toward center section 76 until contact is made between the plunger and an annular projection 116 on tubular member 74 which projects into passage 84. A rod 118 projects through passage 106 and is threadably engaged with plunger 112 at one end and has another end seated in a bore 120 that is centrally located within a cylindrical shearing member 122. Shearing member 122 is positioned loosely within outlet passage 48. A conical surface 124 on shearing member 122 has a point which is spaced from shear disk 50. The diameter of member 122 is substantially less than the diameter of passage 62 in end cap 58. The end of rod 118 within bore 120 is free to move relative to member 122 upon the application of a relatively small amount of force. A compression spring 126 engages plunger 112 at one end and valve 96 at the other end and resiliently biases the plunger into engagement with gas producing strips 88 and surface 100 of the valve into engagement with corner 108.

A chamber 128 is defined within passage 84 between end 129 of valve 96 and end 131 of plunger 112. Chamber 128 communicates with chamber 83 through clearance passage 119 in valve 96. All of the chambers in fluid supply 12 communicate with one another through the various passages. This results in the equalization of the pressure of the gas in all of the chambers of the sealed fluid supply.

Operation of the FIG. 1 Embodiment

The operation of the FIG. 1 embodiment is described with reference to FIGS. 1 through 7. When a collision condition is sensed, an electrical signal is fed through leads 92 from the sensor (not illustrated) to igniter 90 which results in the ignition of gas producing strips 88. The ignition of gas producing strips 88 causes a rapid pressure increase in the gas producing portion of passage 84, which forces plunger 112 to move to the right in FIG. 1, shearing pins 114 and uncovering ports 87. Plunger 112 moves into engagement with annular projection 116 while simultaneously forcing the conical surface 124 of shearing member 122 through shear disk 50. The pressure of the gas in chamber 83 forces shearing member 122 off of the end of rod 118 pushing the shearing member into passage 62 in end cap 58.

Immediately after shear disk 50 is ruptured gas begins to exit through outlet passage 48 into passage 62 of end cap 58 around shearing member 122 and through exit ports 64 into diffuser 14 to initiate expansion of confinement 16. While gas exits through outlet passage 48, the gas produced by strips 88 exits through uncovered ports 87 from passage 84 into chamber 42. Gas simultaneously exits at a controlled rate from chamber 42 through passage 85 into chamber 83.

As illustrated in FIG. 3, the stored gas in chamber 83 produces a rapidly increasing mass flow rate of gas into confinement 16 followed by a gradually decreasing mass flow rate over a period of time of several milliseconds from $t_o$ to $t_1$. The rapid increase and decrease in the mass flow rate caused by the gas in chamber 83 results in the initial puffing of confinements 16, pivoting door 20 downwardly. Further, the initial puffing of confinement 16 caused by the gas in chamber 83 will result in the location of a surface of the confinement at a position adjacent a standing child 130 as illustrated in FIG. 4. In the absence of a standing child 130, the initial puffing merely results in an expansion of confinement 16 which is sufficient to open door 20 and place the confinement in a position for further expansion to restrain a seated occupant of the vehicle.

The movement of plunger 112 into engagement with projection 116 decreases the volume of chamber 128 and thereby increases the pressure of the gas therein. The pressure increase in chamber 128 results in a greater force on end 129 of valve 96 which in turn exerts an increased sealing force between corner 108 and surface 100. As the stored gas from chamber 83 rapidly enters diffuser 14 and causes expansion of confinement 16, a pressure differential develops between the gas in chamber 83 and the gas in chamber 128 due to the difference in the cross-sectional area of outlet passage 48 and clearance passage 119. This pressure differential results in a flow of gas from chamber 128 through clearance passage 119 to chamber 83. As gas exits from chamber 128, the sealing force exerted on valve 96 gradually decreases. At the same time however the pressure of the gas in chamber 42 is rapidly increasing due to the gas produced by strips 88. The stored gas in chamber 42 creates a force on surface 100 which is opposite in direction to the force exerted on end 129 by the stored gas in chamber 128. By properly choosing the area of the surface 100 and the area of end 129, and by varying the size of clearance passage 119, and the amount of gas produced by strips 88, a valve can be designed which will delay the exiting of gas from chamber 42 through passages 86 and will further control the rate at which the gas will eventually leave chamber 42 through passages 86.

As the difference in pressure primarily between the gas in chamber 128 and chamber 42 develops, creating a force differential on valve 96, a controlled flow of gas passes from chamber 42 to chamber 83 through biased passage 85. This controlled flow of gas results in the flat constant mass flow rate which is shown defining the cross-sectioned portion from time $t_1$ to time $t_2$ of the graph illustrated in FIG. 5. The flow through passage 85 exists from the time the shear disk 50 is ruptured, $t_o$, to the time all of the gas in fluid supply 12 has been evacuated. The flow of gas through passage 85 further results in the continued expansion of confinement 16 which causes the confinement to expand at a relatively low rate to force a standing child 130 into seat 132 at a controlled velocity as illustrated in FIG. 6. The confinement in the FIG. 6 position is still not completely expanded. In the event that a standing child 130 is not present, the flow of gas through passage 85 expands the confinement to a position adjacent a seated occupant.

When the force exerted on surfaces 100 and 102 and that portion of valve 96 communicating with chamber 83 exceeds the force exerted on end 129, valve 96 begins to move to the left in FIG. 1 permitting stored gas in chamber 42 to flow through passages 86 into chamber 83 and eventually into confinement 16. The movement of the valve is directly related to the gas pressures in chambers 83, 42 and 128, the respective areas of valve 96 in contact with each of the pressures and the force of spring 126. The flow of gas through passages 86 causes another increase in the mass flow rate of gas from fluid supply 12 which is controlled by the opening movement of valve 96. The increase in the mass flow rate of gas beginning at time $t_2$ is followed by a relatively constant mass flow rate which has a magnitude which is greater than the maximum magnitude of the mass flow rate of gas from chambers 83. The relatively constant mass flow rate is thereafter followed by a gradual decrease in the mass flow rate. The flow beginning with the opening of passages 86 at time $t_2$ is illustrated in graphical form by the sectioned portion of the curve in FIG. 7. Movement of valve 96 varies the shape of the sectioned portion of the curve in FIG. 7 by varying the opening, between corner 108 and surfaces 100 and 102, through which most of the gas from chamber 42 flows into chamber 83.

During a collision, a seated occupant 130 is moving forward during the time period $t_2$ to $t_f$ into contact with a completely expanded confinement 16. The gas in confinement 16 absorbs the forward kinetic energy of the occupant and thereby reduces the forces of the collision.

To summarize the above operation, confinement 16 is initially puffed, as shown by the sectioned portion of the graph in FIG. 3, during the time period $t_o$ to $t_1$, in order to open door 20 and deploy confinement 16 for expansion and to position a surface of the confinement relative to a standing child 130 that may be present in the vehicle. This puffing is primarily accomplished by the stored gas in chamber 83. Following the initial puffing, confinement 16 is further expanded at a relatively constant mass flow rate by a flow of gas from chamber 42 through passage 85 into chamber 83. This flow results in the further expansion of the confinement to a position adjacent a seated occupant of the vehicle and also locates a standing child 130 that may exist into a seat 132 at a controlled velocity. The flow from passage 85 is graphically illustrated by the sectioned portion in FIG. 5 from time $t_1$ to $t_2$. The expansion of confinement 16 is completed by the gas flowing from chamber 42. The majority of the gas entering the confinement flows through passages 86 around surfaces 100 and 102 into chamber 83 and is graphically illustrated by the sectioned portion in FIG. 7 from time $t_2$ to $t_f$. The flow through passages 86 can be delayed by proper design of valve 96. Further, the shape of the curve of mass flow rate of gas plotted against time can be changed by varying the angles of the surfaces 100 and 102, and their location relative to passage 82 and corner 108. As illustrated in FIGS. 3, 5 and 7 at time $t_f$ confinement 16 is completely expanded. The gas supplied by fluid supply 12 is greater than the amount of gas needed to expand confinement 16.

Construction of the FIG. 8 Embodiment

Fluid supply 140 includes pressure vessel 142 having a cup-shaped cylindrical shell 143 with a reduced open end portion 144. An annular ring 146 is welded at 148 to reduced portion 144 of shell 143 and defines a threaded passage 150 and an external threaded portion 151. Diffuser 14 is in threaded engagement with threaded portion 151.

A rupturable seal assembly 152 is used to close passage 150 at one end and includes an annular ring 154 in threaded engagement with a number of the threads in passage 150. A shoulder 156 on ring 154 contacts one end of ring 146. A shear disk 158 in the form of a segment from a hollow sphere is welded at 160 to ring 154 and projects inwardly into vessel 142. A notch 162, in the form of an "X" located within a circle, is located on a peripheral surface 164 of shear disk 158. Explosive charges 166 are sealed within a plug 168, e.g., made of an incompressible material. The plug seals an outlet passage 170 that is centrally located within ring 154. Outlet passage 170 communicates with diffuser 14 at one end with disk 158 at the other end. Electrical leads 172 are connected to charges 166 and to a collision detecting sensor of a known design (not illustrated).

A tubular assembly 174 is centrally located within vessel 142 and includes a tubular section 176, a central plate 178 and a cup-shaped tubular section 180. The internal cylindrical surface of tubular section 176 defines a passage 181. Tubular section 176 has one end in threaded engagement with threaded portion 150 of ring 146 and the other end enclosed by and in threaded engagement with one end of center plate 178. Cup-shaped tubular section 180 has an open end in threaded engagement with the other end of center plate 178.

A valve 182, similar to valve 96 in FIG. 1, is in sliding engagement with passage 181 of tubular section 176 between center plate 178 and an annular internally projecting shoulder 184. First and second surfaces 186 and 187 similar to surfaces 100 and 102 in FIG. 1, are located on one end of valve 182 with surface 186 in engagement with an annular corner 188 on shoulder 184 to form a seal therebetween. An O ring 190 located in a circumferential groove encircles valve 182 and forms a seal between tubular section 176 and the valve. A compression spring 192 has one end located within a centrally located bore 194 in center plate 178 and the other end located within a centrally located bore 196 in end 198 of valve 182. Spring 192 biases surface 186 of valve 182 into sealing engagement with corner 188.

Valve 182 divides passage 181 into chambers 200 and 202. Chamber 200 communicates with peripheral surface 164 of shear disk 158. Centrally located within valve 182 is a passage 204 having a reduced orifice portion 206. Passage 204 communicates with chambers 200 and 202. Radial passages 208 in tubular section 176 communicates with chamber 200 and an annular chamber 210 defined by the external cylindrical surface of tubular member 174 and the internal surface of vessel 142. Radial passages 212 in tubular section 176 communicates with annular chamber 210 and with chamber 200 when valve 182 is moved to the right in FIG. 2.

Cup-shaped section 180 houses a plurality of strips of gas producing material 214, such as Amoco JT 1/20 produced by Amoco Chemical Company. The strips are spaced circumferentially around a chamber 216 defined by section 180 and center plate 178. A plurality of radial ports 218 located in section 180 communicates with chamber 216 and chamber 210.

A percussion igniter 220, of a known design, is located in chamber 216 and has a percussion pin 222 projecting through a passage 224 in center plate 178 and into chamber 202. The igniter actuates upon movement of pin 222 to the right in FIG. 8.

A fill plug 226, of a known design and similar to plug 68 in FIG. 1, is positioned in the end of vessel 142. Plug 226 is used for the introduction of gas, such as nitrogen, at a pressure of 2000 to 3000 psi into fluid supply 140. After introducing gas into fluid supply 140 plug 226 seals that portion of the fluid supply in order to prevent gas leakage. The gas in fluid supply 140 flows into all of the chambers via the various passages resulting in the equalization of the gas pressure throughout the fluid supply.

Operation of the FIG. 8 Embodiment

After a collision condition is sensed by the sensor (not illustrated), an electrical signal is fed through leads 172 to explosive charges 166. Charges 166 explode removing plug 168 from outlet passage 170. The explosion results in the rupture of shear disk 158 along notched 162 into chamber 200. Shear disk 158 moves inwardly into chamber 200 thereby opening communication between chamber 200 and the diffuser 14 via passage 170. The stored pressurized gas in chamber 200 immediately begins to exit through outlet passage 170 to cause an initial expansion of confinement 16. This expansion, as with the embodiment illustrated in FIG. 1, causes an initial puffing of the confinement. As illustrated in graphical form in FIG. 9, the rapid increase in the mass flow rate of gas from chamber 200 and the following gradual decrease is indicated between times $t_o$ and $t_1$.

The radial passages 208 act in a manner similar to biased passage 85 in FIG. 1 and continue to effect expansion of confinement 16 during the time period $t_1$ to $t_2$. The mass flow rate of gas out of chamber 210 into chamber 200 and eventually into confinement 16 is relatively constant during the time $t_1$ to $t_2$.

As gas initially exits from chamber 200 into confinement 16, gas also flows from chamber 202 through passage 204 into chamber 200. When the pressure of the gas in chamber 202 decreases below a predetermined value, the force exerted by the gas on surface 198 of valve 182 becomes less than the force exerted by the gas in chamber 210 on surface 186 and the gas in chamber 200 on surface 187 and that portion of valve 182 communicating with chamber 200. At time $t_2$ in FIG. 9, valve 182 in FIG. 8 begins to move to the right causing another increase in the mass flow rate of gas out of fluid supply 140 to continue to effect expansion of confinement 16. The major portion of the gas flow beginning at time $t_2$ passes through passages 212 and is controlled by the movement of valve 182.

As the difference in pressure primarily between the gas in chamber 202 and chamber 210 increases, valve 182 moves further to the right in FIG. 8. A point is reached at which contact is made between end 198 of valve 182 and percussion pin 222 of percussion igniter 220. Percussion pin 222 is forced to the right in FIG. 8 causing actuation of igniter 220. Igniter 220, upon actuation ignites gas producing strips 214 producing a quantity of gas which flows from chamber 216 through ports 218 into chamber 210. Actuation of percussion igniter 220 occurs at time $t_3$ in FIG. 9. The actuation results in a gradual increase in the mass flow rate of gas from fluid supply 140 between the times $t_3$ and $t_4$.

At time $t_4$ the mass flow rate of gas from fluid supply 140 begins to decrease and eventually, at time $t_f$, confinement 16 becomes fully expanded. As with the embodiment illustrated in FIG. 1, an excess amount of gas is provided in fluid supply 140 in order to replace gas escaping from the confinement through blowout patches, or the like, which are generally located within the confinement.

Summary of the FIG. 1 and FIG. 8 Embodiments

The springs 126 and 192 illustrated in the two embodiments have a relatively low preload and load rate. The primary purpose of the springs is to hold the respective valves 96 and 182 in the closed position prior to actuation. Upon actuation of the respective fluid supplies, the difference in pressure of the gas in the chambers on opposite sides of the respective valves will maintain the valves in the closed positions. When the force exerted on the surfaces 100 and 102 and that portion of valve 96 communicating with chamber 83 and the surfaces 186 and 187 and that portion of valve 182 communicating with chamber 200, respectively, overcomes the force exerted on the surfaces 129 and 198, the respective valve will move to the open position.

In both of the illustrated embodiments, the initial mass flow rate of gas flowing from the fluid supply rapidly increases and then decreases, causing an initial puffing of confinement 16. The puffing is followed by a period in which a constant mass flow rate of gas exits from the fluid supply to further expand the confinement. This constant mass flow rate period is subsequently followed by a further controlled increase in the mass flow rate of gas to complete expansion of the confinement.

The actuation of the valves 96 and 182 in the two embodiments is respectively governed by the flow of gas out of the chambers 128 and 202. The flow from chambers 128 and 202 is controlled, respectively, by the size of clearance passage 119 and the size of orifice 206. Movement of the valves 96 and 182 is further controlled, to a large extent, by the force exerted respectively on surfaces 100 and 186, and surfaces 129 and 198. This force may be increased or decreased by varying the ratio of the areas of the respective surfaces.

In each embodiment, confinement 16 continues to expand from time $t_o$ and $t_f$. This continued expansion is partially caused by the flow of gas from the chambers 42 and 210, respectively, through the passages 85 and 208. An increase or decrease in the mass flow rate prior to the opening of valves 96 and 182 may be accomplished by respectively increasing or decreasing the cross sectional area of the passages 85 and 208.

The rise in the mass flow rate of gas caused by the opening movement of the valve is also affected by the location of corner 108 and 188 related to surfaces 100, 102 and 186, 187. For example, if contact is made with the surfaces 100 or 186, there is a stepped increase in flow when the valve moves to the open position. This stepping effect may be prevented by having the corners seat at the intersection, respectively of the surfaces 100, 102 and 186, 187. The angle of the surfaces 100, 102 and 186, 187 further control the mass flow rate of gas around the respective valve and into the confinement. The flow of gas around the respective valves governs the rate at which the gas leaves chambers 42 and 210 via passage 86 and 212.

In the embodiment illustrated in FIG. 8, the gas generating arrangement located in cup-shaped tubular section 180 may be removed and the volume of chamber 210 increased. In this latter arrangement, the system would be a pure stored gas fluid supply. The mass flow rate of gas would then be similar in general configuration to that illustrated in FIGS. 3, 5 and 7. Further, chamber 200 could be eliminated in the FIG. 8 embodiment. The elimination of chamber 200 and cup-shaped tubular section 180 would result in a flow curve which would resemble the portion of the graph illustrated in FIG. 7 that begins at time $t_2$.

The FIG. 8 embodiment may be also modified by the removal of percussion igniter 220 and the addition of an igniter similar to igniter 90 illustrated in FIG. 1. The igniter would be located in shell 143 and project into chamber 216. A time delay circuit of a known design (not shown) would be connected to the collision detecting sensor (not shown), the igniter and the leads 172. In operating the modified embodiment just described upon the detection of a collision condition, a signal would be first forwarded through leads 172 to explosives 166. Upon the opening of passage 170 by the explosion, gas would exit from chamber 200 to cause an initial puffing of the confinement followed by a flow of gas from passages 208. Valve 182 would thereafter operate to release the gas in chamber 210 to further expand the confinement. A second signal would be forwarded to the igniter 90 to ignite material 214 in chamber 216 at a predetermined time during expansion of the confinement to aid in the complete expansion of the confinement. If the igniter 90 ignited the material 214 at time $t_3$ in FIG. 9, the modified FIG. 8 embodiment would operate similar to the FIG. 8 embodiment. If the ignition of material 214 occurred at time $t_o$ the operation would be similar to the FIG. 1 embodiment. Other variations are also contemplated.

In place of the time delay circuit, a dual sensing device of a known design could be connected to leads 172 and the igniter 90 of the previously described modification of FIG. 8. In this arrangement a first signal would be forwarded to explosives 166 through leads 172 in the event of a low level of minor collision — a collision, for example, occurring at 15 to 25 mph. The modified embodiment would produce a mass flow of gas similar to that illustrated in FIG. 3. If a high level or major collision occurred — a collision, for example, occurring over 25 mph — a second signal would be forwarded to the igniter resulting in both the opening of passage 170 and the ignition of material 214. The second signal could either be forwarded simultaneously with the first signal or in a timed delay relationship with the first signal. The use of the gas produced by material 214 would be for either decreasing the time it takes to expand the confinement after a collision condition is detected or maintaining the confinement in an expanded position for a longer period of time depending upon the relationship of the two signals.

In designing an effective system complete expansion of confinement 16, from the time a collision condition is first sensed, must be accomplished in less than one hundred milliseconds. The size of the various passages as well as the gas producing capabilities of the systems and the pressure of the stored gas will be governed by this time limitation and by the expanded volume of the confinement.

In each of the illustrated and modified embodiments, the maximum mass flow rate is relatively low as compared to prior art fluid supplies. This relatively low maximum mass flow rate is attributable to the fact that the mass flow rate of gas, over the total time period from $t_o$ to $t_f$ and $t_2$ to $t_f$ is relatively constant as compared to other prior art stored gas fluid supplies such as the single chamber stored gas fluid supply.

What is claimed is:

1. A fluid supply for use with an occupant restraint system including an inflatable confinement having a collapsed non-operative position and an expanded operative condition for restraining movement of the vehicle occupant in the event of a collision, and means for directing inflating fluid to the confinement, said fluid supply comprising:
    a. a source of pressurized inflating fluid;
    b. means defining a discharge passage communicating said source of pressurized inflating fluid with said fluid directing means;
    c. means defining a control pressure chamber initially charged with pressurized fluid;
    d. port means communicating said control pressure chamber with said discharge passage to permit fluid flow from said control pressure chamber to said discharge passage;
    e. means sealing said discharge passage to prevent fluid flow to said directing means;
    f. means operable upon occurrence of a collision to activate said fluid source and disable said sealing means such that fluid flows from said port means through said discharging passage;
    g. flow control means associated with said discharge passage responsive, upon actuation of said fluid source and disabling of said sealing means, to the difference between the pressure in said fluid source and the pressure in said control pressure chamber, to move progressively from a first position restricting flow from said fluid source to said discharge passage when said pressure difference is less than a predetermined value, to a position permitting increased flow from said fluid source to said discharge passage as the pressure difference increases above said predetermined value.

2. The fluid supply defined in claim 1 wherein said means operable to disable said sealing means includes explosive means operable in response to a collision occurrence signal.

3. The fluid supply defined in claim 1 wherein said source of pressurized fluid includes a pressure vessel containing a supply of compressed fluid.

4. The fluid supply defined in claim 3 wherein said control pressure chamber has a volume substantially less than said pressure vessel.

5. The fluid supply defined in claim 3 wherein said means defining said pressure control chamber is disposed within said pressure vessel.

6. The fluid supply defined in claim 5 wherein said source of pressurized fluid includes gas generating material.

7. The fluid supply defined in claim 6 wherein said gas generating material is disposed in said pressure vessel.

8. The fluid supply defined in claim 6 wherein said means activating said fluid source includes explosive means operable in response to a collision signal to ignite said gas generating material;
    a. said sealing means includes a frangible member;
    b. said seal disabling means includes means movable in response to ignition of said gas generating material to rupture said frangible member.

9. The fluid supply defined in claim 1 wherein said flow control means responsive to said difference in pressure includes a movable member having portions thereof defining in part said control pressure chamber.

10. The fluid supply defined in claim 9 wherein said flow control means responsive to said difference in pressure includes means biasing same to said first position.

11. The fluid supply defined in claim 1 wherein said port means communicating said control pressure chamber with said discharge passage includes means defining an orifice through said movable member.

12. A fluid supply for a vehicle occupant restraint system including an inflatable confinement having a collapsed nonoperative position and an expanded operative condition for restraining an occupant in the event of a collision and means for directing inflating fluid to the confinement, said fluid supply comprising:
    a. a source of pressurized fluid including reservoir means charged with fluid under pressure;
    b. means defining a discharge passage including inlet port means communicating with said fluid reservoir and outlet port means communicating with said fluid directing means;
    c. means defining a control pressure chamber;
    d. means communicating said control pressure chamber with said discharge passage;
    e. means sealing said discharge passage outlet to prevent fluid flow to said directing means;
    f. means operable upon occurrence of a collision to activate said fluid source and disable said sealing means such that said pressure control chamber and said reservoir means discharge through said passage to said directing means;
    g. flow control means associated with said inlet port means and operable during said discharge, in response to a difference in pressure between said control pressure chamber and said reservoir means, to progressively move from a first position substantially restricting fluid flow from said reservoir means to a position permitting greater fluid flow from said reservoir means.

13. The fluid supply defined in claim 12 wherein said means defining said control chamber includes a portion of said flow control means.

14. The fluid supply defined in claim 13 wherein said flow control means includes a member movable in said control pressure chamber, and said means communicating said control pressure chamber with said discharge passage includes an orifice formed in said member.

15. The fluid supply defined in claim 12 wherein said flow control means includes a movable valve member and said means communicating said reservoir means with said discharge passage includes an annular valve seat having said valve member in contact therewith when said flow control means is in said first position and having said valve member spaced from said seat when said flow control means is in said position permitting greater flow.

16. The fluid supply defined in claim 12 wherein said source of pressurized fluid further includes gas generating material and said means operable to activate said fluid source includes means operable to initiate said gas generating material.

17. The device defined in claim 16 wherein said gas generating material is disposed within said reservoir means.

18. The fluid supply defined in claim 16 wherein:
   a. said gas generating material is diposed within said reservoir means;
   b. said flow control means includes a member movable with respect to said means defining said control pressure chamber, said member having portions thereof defining in part said control pressure chamber, and said means communicating said control pressure chamber with said discharge passage includes an orifice formed in said member;
   c. said sealing means includes a rupturable member;
   d. said seal disabling means includes plunger means received through said orifice, said plunger means being operative, upon activation of said gas generating material, to open said rupturable seal means.

19. A fluid supply for an inflatable vehicle occupant restraint, said fluid supply comprising;
   a. means providing a source of pressurized fluid;
   b. means for activating said source and releasing said fluid in response to a vehicle collision signal;
   c. means defining a discharge passage having inlet port means communicating with said source of fluid;
   d. means defining a control pressure chamber;
   e. means communicating said control pressure chamber with said discharge passage, including orifice means for controlling discharge of fluid from said control chamber to said discharge passage;
   f. flow control means associated with said inlet port means including pressure responsive means initially restricting fluid flow to said discharge passage and, upon activation of said fluid source and release of said fluid, operable in response to a difference in pressure between said control pressure chamber and said fluid source to progressively decrease said flow restriction; and
   g. said means releasing said fluid includes sealing means disposed in said discharge passage and means to disable said sealing means.

20. The fluid supply defined in claim 19 wherein said source of pressurized fluid includes gas generating means.

21. The fluid supply defined in claim 19 wherein said source of pressurized fluid includes a pressure vessel containing fluid under pressure.

22. The fluid supply defined in claim 21 wherein said source of pressurized fluid further includes gas generating means disposed within said pressure vessel and said means operable to activate said fluid source includes means operable to initiate said gas generation material substantially simultaneously with disabling of said seal means.

23. The fluid supply defined in claim 21 wherein said means defining said control pressure chamber is disposed within said pressure vessel.

24. The fluid supply defined in claim 21 wherein said control pressure vessel has a volume substantially less than said pressure vessel.

25. A fluid supply for an inflatable vehicle occupant restraint system, said fluid supply comprising:
   a. gas generating means activated upon the vehicle experiencing a collision;
   b. means defining a discharge passage having inlet port means in communication with said gas generating means;
   c. means defining a control pressure chamber initially charged with pressurized fluid;
   d. means communicating said control pressure chamber with said discharge passage;
   e. means sealing said discharge passage to prevent fluid flow therethrough;
   f. means operable upon the vehicle experiencing a collision to disable said sealing means to permit discharge of said control chamber through said passage;
   g. flow control means associated with said inlet port means and having an initial position substantially restricting flow through said inlet port means and, upon activation of said gas generating means and disabling of said sealing means, said flow control means being operable in response to an increasing differential between the pressure of said generated gas and the pressure in said control chamber to progressively remove said flow restriction in said inlet port means.

26. A fluid supply for a vehicle occupant restraint system including an inflatable confinement having a collapsed nonoperative condition and an expanded operative condition for restraining an occupant in the event of a collision and means for directing inflating fluid to the confinement, said fluid supply comprising:
   a. a source of pressurized fluid including reservoir means charged with fluid under pressure and gas generating means;
   b. means defining a discharge passage including means communicating with said fluid reservoir and with said fluid directing means;
   c. means defining a control pressure chamber;
   d. means communicating said control pressure chamber with said discharge passage;
   e. means sealing said discharge passage to prevent fluid flow to said directing means;
   f. means communicating said gas generating means with said reservoir;
   g. means operable upon the occurrence of a collision to disable said sealing means such that said pressure control chamber and said reservoir means discharge through said passage to said directing means;
   h. flow control means associated with said discharge passage and operable during said discharge in response to a difference in pressure between said control pressure chamber and said reservoir means to progressively move from a first position substantially restricting fluid flow from said reservoir means to a second position permitting greater fluid flow from said reservoir means; and
   i. percussion means operable upon contact by said flow control means moving to said second position to activate said gas generating means.

* * * * *

UNITED STATES PATENT AND TRADEMARK OFFICE
CERTIFICATE OF CORRECTION

PATENT NO. : 3,948,540
DATED : 4/6/76
INVENTOR(S) : George B.K. Meacham

It is certified that error appears in the above-identified patent and that said Letters Patent are hereby corrected as shown below:

Col. 13, line 61: "vessel" should read "chamber".

Signed and Sealed this fifteenth Day of June 1976

[SEAL]

Attest:

RUTH C. MASON
*Attesting Officer*

C. MARSHALL DANN
*Commissioner of Patents and Trademarks*